United States Patent [19]

Fujita

[11] 4,443,178
[45] Apr. 17, 1984

[54] VALVE NOZZLE DEVICES

[75] Inventor: Shigeru Fujita, Numazu, Japan

[73] Assignee: Toshiba Kikai Kabushiki Kaisha, Tokyo, Japan

[21] Appl. No.: 402,853

[22] Filed: Jul. 29, 1982

[30] Foreign Application Priority Data

Jul. 30, 1981 [JP] Japan ................................ 56-119685
Oct. 15, 1981 [JP] Japan ................................ 56-164664
Oct. 15, 1981 [JP] Japan ................................ 56-164665

[51] Int. Cl.³ .............................................. B29F 1/03
[52] U.S. Cl. ............................. 425/564; 264/328.12; 425/570
[58] Field of Search ............... 425/564, 566, 568, 570; 264/328.12

[56] References Cited

U.S. PATENT DOCUMENTS 4,303,382 12/1981 Gellert ............................. 425/566

*Primary Examiner*—Thomas P. Pavelko
*Attorney, Agent, or Firm*—Koda and Androlia

[57] ABSTRACT

A valve nozzle device provided between a heating cylinder of an injection molding machine and at least one metal mold, includes at least one nozzle combined with at least one needle valve for injecting plastic resin melted in the heating cylinder into the metal mold. The device is further provided with a first passage connected with the heating cylinder, third passages each provided around the needle valve to be merged into the nozzle, and second passages interconnecting the first and the third passages. The second passage has a central axis extending in a plane other than a plane including a central axis of the needle valve, and is connected with the third passage in a positional relation such that the plastic resin in the second passage flows into the third passage from one side thereof followed by a helical path around the needle valve.

8 Claims, 20 Drawing Figures

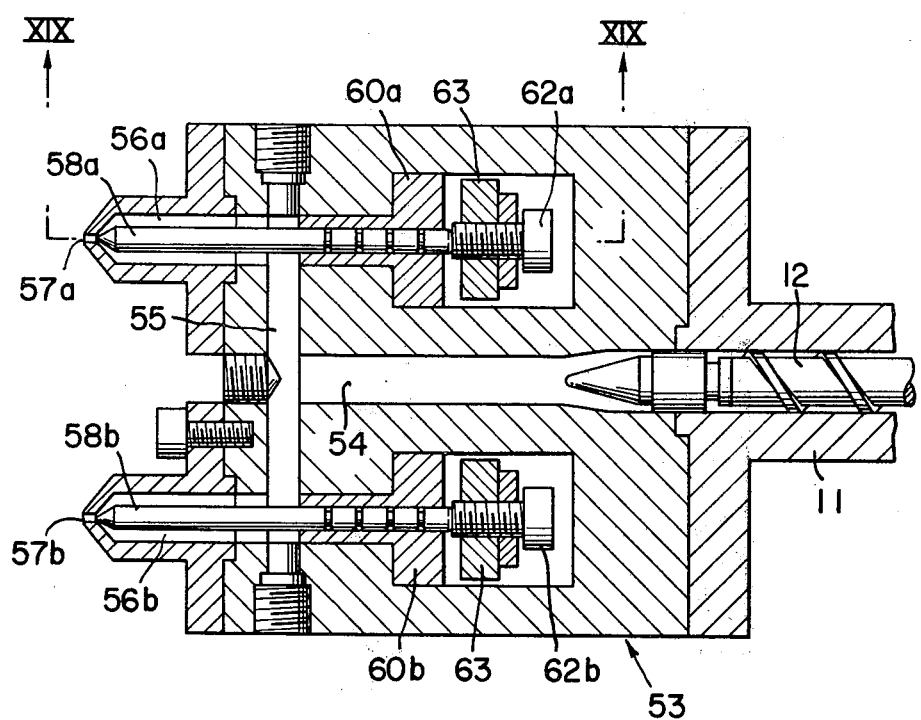
F I G. 18

VALVE NOZZLE DEVICES

BACKGROUND OF THE INVENTION

This invention relates to a valve nozzle device used in conjunction with an injection molding machine.

Heretofore a device has been used including a nozzle and a valve that controls the operation thereof, and such a device is hereinafter termed a valve nozzle device.

FIG. 1 illustrates an example of the valve nozzle device which is coupled with a material heating cylinder 1 of an injection molding machine. In the cylinder 1, a material for instance a plastic resin is heated to a melted state, and while the weight of the resin being measured, the melted resin is forced by a feed screw 2 provided in the cylinder 1 into a passage 3 and then into a chamber 4 both provided in the valve nozzle device.

The device further comprises a needle valve 5 which is urged by a spring 7 toward a nozzle 6 formed at one end of the chamber 4. When the pressure of the plastic resin in the chamber 4 rises beyond a predetermined value, the needle valve 5 retracts against the force of the spring 7 to open the nozzle 6.

The needle valve 5 is passed through a sheath or torpedo 9 rigidly supported by spiders 8 of the valve nozzle device. However, the rigid support of the spiders 8 inevitably restricts the passage 3 formed through the spiders 8 as shown in FIG. 2 wherein the passage 3 is divided into a number of round holes 3a of comparatively small diameters or as shown in FIG. 3 wherein the passage 3 is formed into two oval holes 3b, thus resulting in a disadvantage of increasing the pressure loss in the passage 3.

Another valve nozzle device has also been known, the device having a number of valve nozzles (two in the example shown) as shown in FIGS. 4 and 5.

The device is provided with a heating cylinder 11 containing a feed screw 12 as described with reference to FIG. 1. The valve nozzle device generally designated by a numeral 13 has a first central passage 14 receiving the melted plastic resin delivered from the heating cylinder 11. The plastic resin is then passed through a second passage 15 extending substantially at right angles with respect to the first passage 14 into valve chambers 16a and 16b, and then injected into metal molds (not shown) through nozzles 17a and 17b formed in communication with the valve chambers 16a and 16b, respectively. Needle valves 18a and 18b provided adjacent to the nozzles 17a and 17b are urged by springs 19a and 19b normally close the nozzles 17a and 17b, respectively. However, when the pressure of the plastic resin in the valve chambers 16a and 16b exceeds a predetermined value, the needle valves 18a and 18b are moved against the forces of the springs 19a and 19b to positions opening the nozzles 17a and 17b, respectively.

With the above described construction of the conventional multivalve nozzle device, since the second passage 15 extending substantially at right angles with respect to the first passage 14 is in a plane including the needle valves 18a and 18b as best illustrated in FIG. 5, stagnation or deposition of the plastic resin is caused at positions A and B shown in FIGS. 6 and 7. The stagnation or deposition of the plastic resin causes a pressure loss in each valve chamber. Although the deposition of the plastic resin may be more or less reduced by selecting the positions of the needle valves 18a and 18b suitably with respect to the second passage 15, heretofore the complete elimination of the stagnation or deposition has been impossible.

SUMMARY OF THE INVENTION

A primary object of the present invention is to provide a valve nozzle device wherein the above described difficulties of the conventional devices are substantially eliminated.

Another object of the invention is to provide a valve nozzle device which is simple in construction and easy to manufacture.

Still another object of the invention is to provide a valve nozzle device wherein the deposition of the plastic material in the passages can be substantially eliminated, thus substantially reducing the pressure loss caused thereby.

Still another object of the invention is to provide a valve nozzle device having a plurality of valve nozzles that can be operated simultaneously.

These and other objects of the present invention can be achieved by a valve nozzle device provided between a heating cylinder of an injection molding machine and at least one metal mold, and including at least one nozzle each controlled by a needle valve so as to inject a plastic resin melted in the heating cylinder into the metal mold, the valve nozzle device comprising first passage means connected to the heating cylinder for supplying the plastic resin melted in the heating cylinder therethrough, third passage means each provided around the needle valve to be merged into the nozzle, and second passage means interconnecting the first and third passage means, the second passage means having a central axis extending in a plane other than a plane including a central axis of the needle valve, the second passage means being connected with the third passage means in such a positional relation that the plastic resin in the second passage means flows into the third passage means from one side thereof followed by a helical path extending around the needle valve.

The aforementioned positional relation may be varied in a range including a position where the circumference of the second passage means is tangent to the circumference of the third passage means, and another position where the circumference of the second passage means is tangent to the central axis of the needle valve.

The invention will now be described in detail with reference to the accompanying drawings.

BRIEF DESCRIPTION OF THE DRAWINGS

In the accompanying drawings:

FIG. 18 is a longitudinal sectional view of a modification of the embodiment shown in FIG. 13;

DESCRIPTION OF THE PREFERRED EMBODIMENTS

Figure 8:
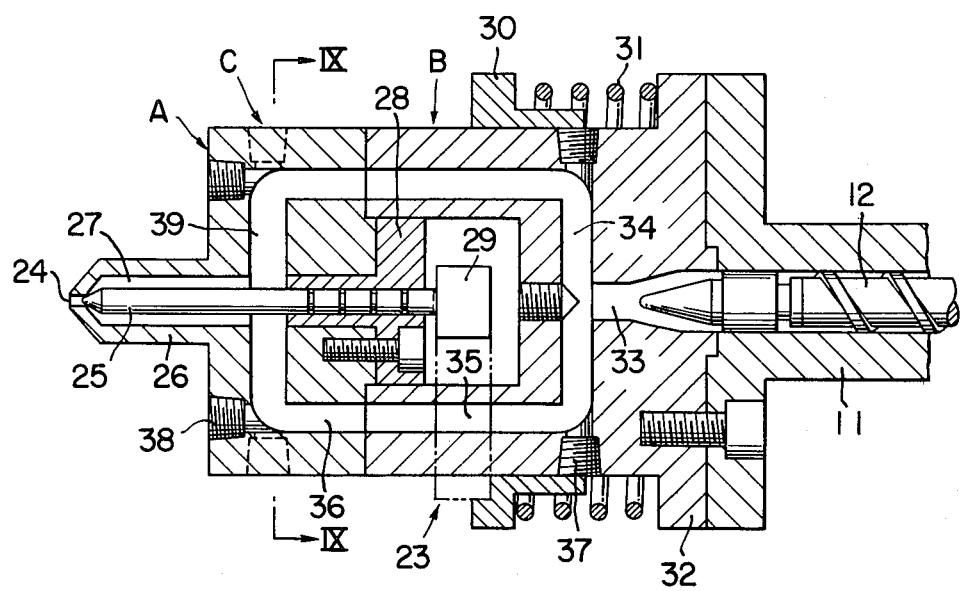
FIG. 8 is a longitudinal sectional view showing a valve nozzle device constituting a preferred embodiment of the present invention.

Referring now to FIG. 8, there is illustrated a preferred embodiment of the present invention, which is provided between a heating cylinder 11 and a metal mold (not shown) of an injection molding machine. The heating cylinder 11 includes a feed screw 12 which forces a plastic resin melted and measured as described hereinbefore in the heating cylinder 11 toward a valve nozzle device embodying this invention. The valve nozzle device which is generally designated by a reference numeral 23 comprises a nozzle 24 and a needle valve 25 movable in the axial direction of the valve nozzle device 23 for opening or closing the nozzle 24. A sleeve member 28 secured to the main body of the valve nozzle device slidably supports the needle valve 25 in a position concentric with a valve chamber 27 formed in a forward block 26 of the main body and with the nozzle 24 opening outwardly from the valve chamber 27. The forward or leftward end of the needle valve 25, as viewed in FIG. 8, is formed into a conical shape engageable with a valve seat (not shown) formed at the entrance of the nozzle 24, while the rear or rightward end, as viewed in FIG. 8, of the needle valve 25 supported by the sleeve 28 is secured to a link 29 connected to an annular member 30 engaged by one end of a coil spring 31, so that the needle valve 25 is normally urged by the force of the coil spring 31 in a direction to close the nozzle 24. During a measuring step of an injection molding process, the valve chamber 27 is filled by a melted plastic resin. When the pressure of the chamber 27 exceeds a predetermined value, the needle valve 25 is shifted rearward against the force of the spring 31 thereby to open the nozzle 24. The device 23 further comprises a rear block 32 provided between the forward block 26 and the heating cylinder 11, and having a central passage 33 which receives the plastic resin supplied from the heating cylinder 11. A through hole providing a lateral passage 34 opening outwardly from the circumferential surface B of the rear block 32 is bored to extend laterally from the central passage 33. The passage 34 is further connected with passages 35 extending along the longitudinal axis of the rear block 32. The passages 35 are connected respectively with passages 36 provided through the forward block 26, which are supplied with the resin supplied from the heating cylinder 11. The central passage 33 is connected with a lateral passage 34 also formed in the rear block 32. The lateral passage 34 in turn is connected with two passages 35 extending longitudinally in the rear block 32. The passages 35 are connected with passages 36 formed in the forward block 26 in a coaxially abutting relation.

More specifically, a through hole for providing the lateral passage 34 is bored through the rear block 32 perpendicularly to the central passage 33 so that the ends of the through hole open outwardly from the outer surface B of the rear block 32. The longitudinal passages 35 are in communication with the through hole, and screw-threaded plugs 37 are threaded into the outer ends of the through hole so that the inner end of each plug 37 reaches the junction between the longitudinal passage 35 and the through hole. The inner end of each plug 37 is shaped to provide a smooth and round internal surface at the junction between the passages 34 and 35.

Screw-threaded plugs 38 are also threaded into a surface A of the forward block 26 at points corresponding to the ends of the passages 36 so that the inner ends of the plugs 38 reach the junction between the passages 36 and passages 39 also formed through the forward block 26. The passages 39 extend substantially at right angles to the passages 36, between the passages 36 and the valve chamber 27 for interconnecting them.

Figure 9:
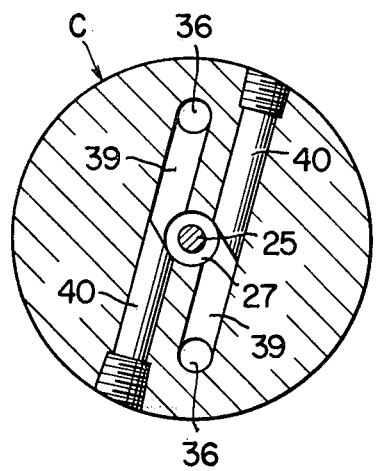
FIG. 9 is a cross-sectional view taken along the line IX—IX in FIG. 8.
Figure 10:
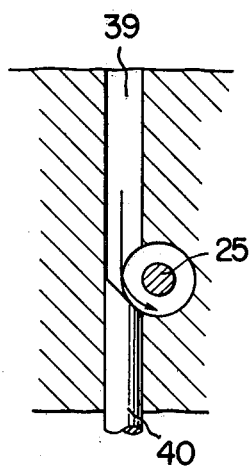
FIGS. 10 and 11 are diagrams showing the flowing manner of a melted plastic material in a passage formed in the embodiment.
Figure 11:
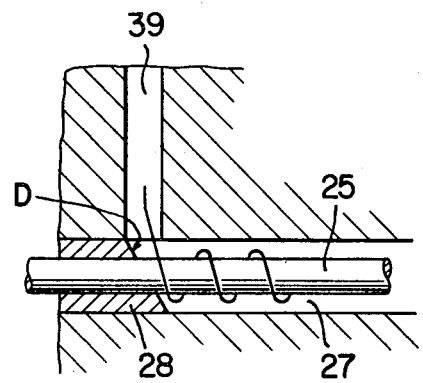

According to the present invention, each of the passages 39 is so disposed that the central axis thereof is in a plane different from that including the central axis of the valve chamber 27 or the needle valve 25, as shown in FIG. 9, and each of the passages 39 is connected with the valve chamber 27 such that the plastic resin in the passage 39 flows into the valve chamber 27 from one side of the chamber 27 following a helical path extending around the needle valve 25 as best illustrated in FIGS. 10 and 11.

In the above described construction, the passages 39 are further extended to open outwardly through a peripheral surface C of the rear block 26, and screw threaded rods 40 are threaded into the extensions of the passages 39. An internal end of each rod 40 may be formed with oblique surface extending in tangent with respect to the peripheral surface of the valve chamber 27, or may be formed with a curved surface smoothly connected with the peripheral surface. With this construction, the plastic resin can be sent from the passages 39 into the valve chamber 27 without turbulance or deposition. Furthermore, the lefthand end of the sleeve member 28 secured to the forward block 26 and the rear block 32 and slidably supporting the needle valve 25 may be further extended forwardly and formed with a oblique surface D as shown in FIG. 11 or a curved surface for accelerating the helical flow of the plastic material.

Figure 12:
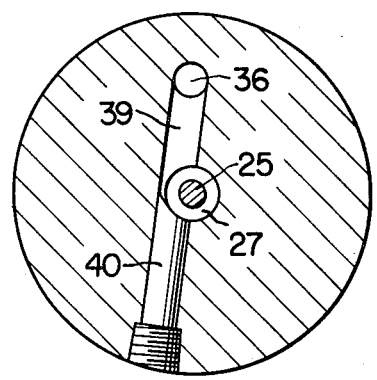
FIG. 12 is a cross-sectional view similar to FIG. 9 showing a modification of the invention.

In case where the quantity of the plastic resin to be injected into the mold is comparatively small, an upper branch, for example, of the passages 34, 35, 36 and 39 may be omitted, as shown in FIG. 12 where only the lower limb of the passage 39 is shown.

FIGS. 13 through 17 illustrate another embodiment of the present invention having two valve nozzles.

Figure 1:
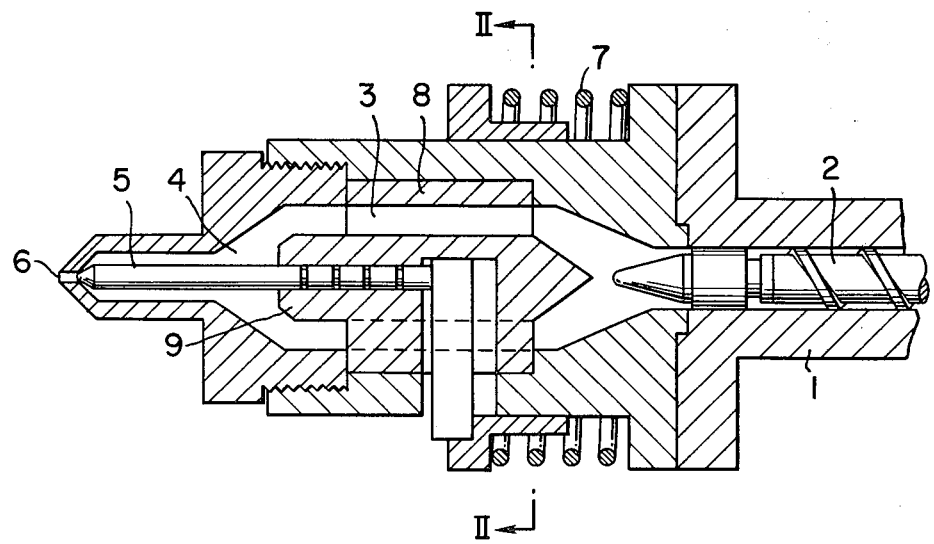
FIG. 1 is a longitudinal sectional view showing a conventional valve nozzle device for an injection molding machine.
Figure 2:
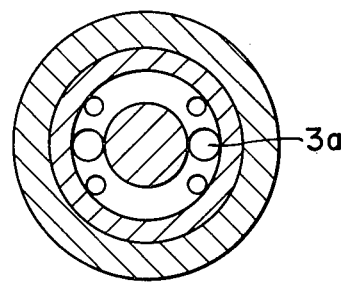
FIG. 2 is a cross-sectional view taken along the line II—II of FIG. 1.
Figure 3:
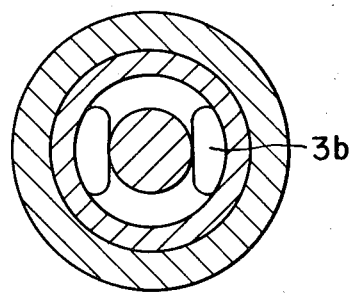
FIG. 3 is a cross-sectional view similar to FIG. 2, showing a modification thereof.
Figure 4:
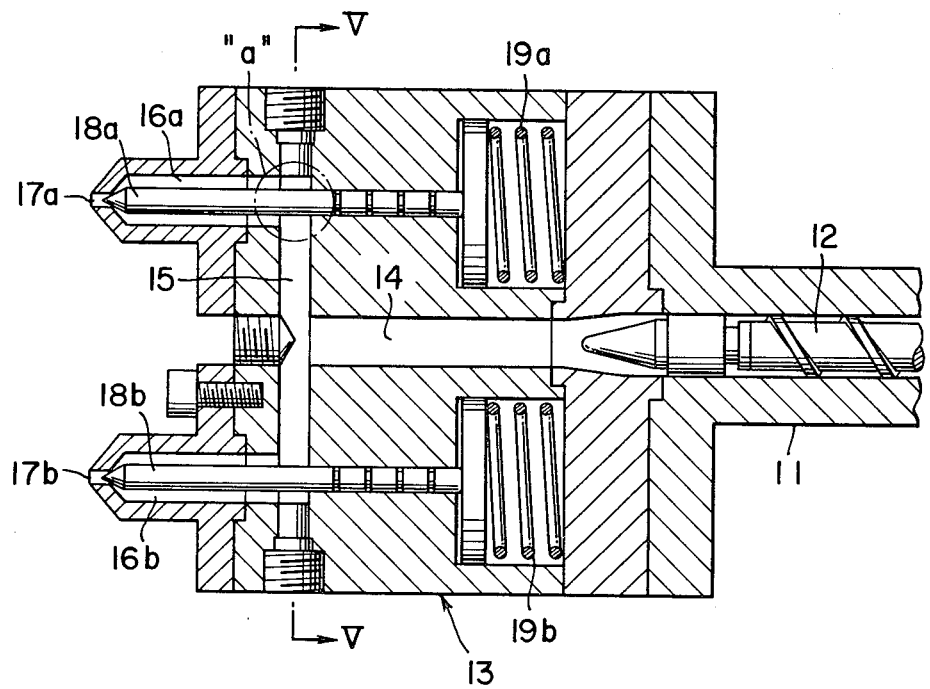
FIG. 4 is a longitudinal sectional view showing another conventional valve nozzle device having two valve nozzles.
Figure 5:
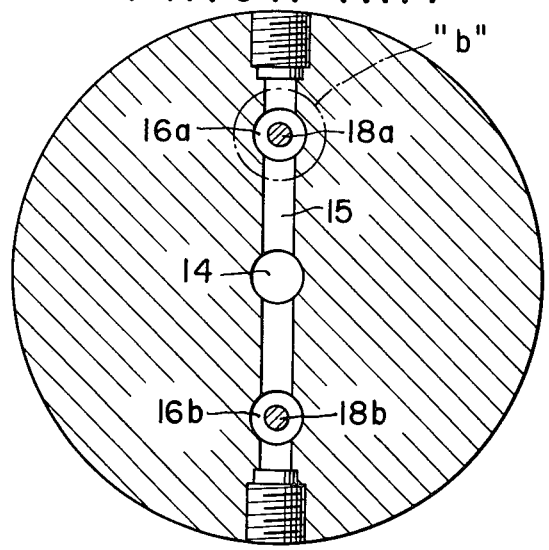
FIG. 5 is a cross-sectional view taken along the line V—V in FIG. 4.
Figure 7:
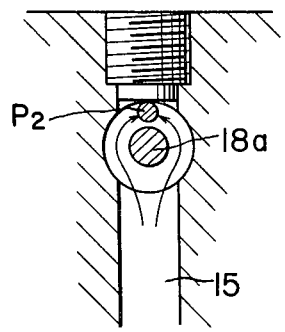
FIGS. 6 and 7 are partial sectional views showing the flow of the melted plastic resin in regions "a" and "b" shown in FIGS. 4 and 5, respectively.
Figure 6:
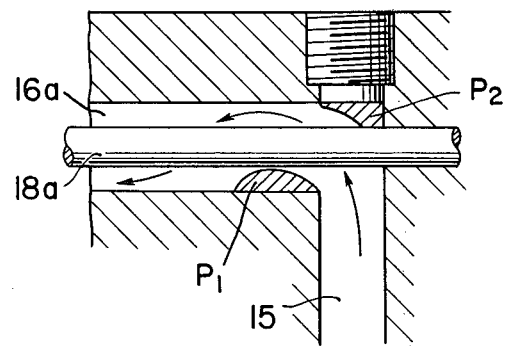
Figure 13:
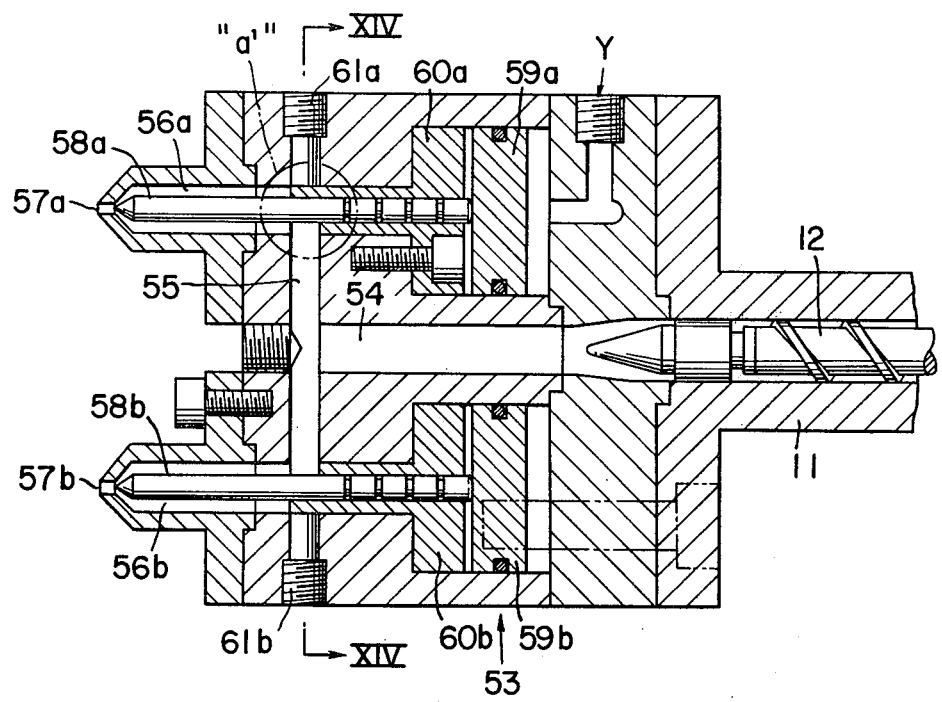
FIG. 13 is a longitudinal sectional view of a valve nozzle device having two valve nozzles, which constitutes another embodiment of the present invention.

As shown in FIG. 13, a valve nozzle device 53 of this embodiment is secured to a heating cylinder 11 including a feed screw 12 of an injection molding machine. A plastic resin melted in the cylinder 11 is fed by the feed screw 12 into a central passage 54 of the valve nozzle device 53. The plastic resin is then fed into valve chambers 56a and 56b through a lateral passage 55, and injected into respective metal molds (not shown) through nozzles 57a and 57b as has been described in connection with the conventional multivalve nozzle device shown in FIG. 4. The delivery of the plastic resin from the nozzles 57a and 57b is controlled by needle valves 58a and 58b. In the embodiment shown the needle valves 58a and 58b are provided with plungers 59a and 59b respectively at their ends away from the nozzles 57a and 57b. The plungers 59a and 59b and hence the needle valves 58a and 58b are urged by pressurized fluid introduced in a direction of an arrow A toward the nozzles 57a and 57b for normally closing them. However, in case of injection the pressurized fluid is drained and the nozzles are opened to flow the plastic resin therethrough. The needle valves 58a and 58b are slidably supported by sleeve members 60a and 60b provided concentrically with the needle valves.

Although a pressurized fluid has been described to act against the rear sides of the needle valves 58a and 58b, it is apparent that pressurized air or springs may also be utilized for urging the needle valves forwardly.

Figure 14:
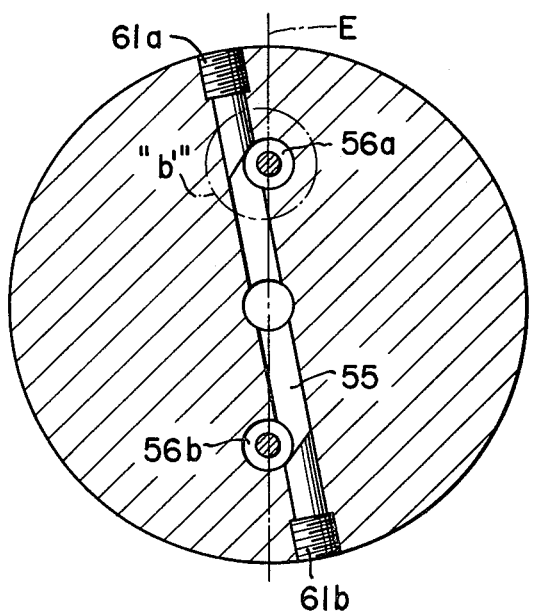
FIG. 14 is a cross-sectional view taken along the line XIV—XIV in FIG. 13.
Figure 15:
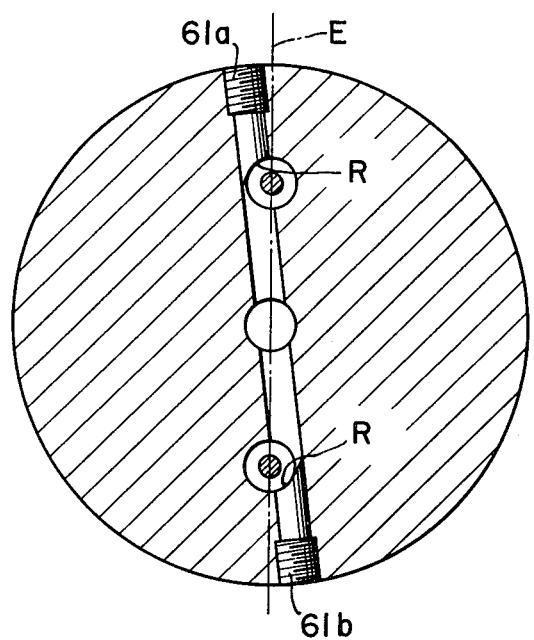
FIG. 15 is a cross-sectional view similar to FIG. 14, showing a modification of the embodiment.

The lateral passage 55 is formed as a through hole opening radially outwardly from the central passage 54. Screw threaded plugs 61a and 61b are threaded into the open ends of the through hole for preventing leakage of the plastic resin. Inner ends of the screw threaded plugs 61a and 61b are formed into curved surfaces R. As shown in FIG. 14, the passage 55 has a peripheral surface tangent to the outer surfaces of the needle valves 58a and 58b. Furthermore, the central axis of the passage 55 is in a plane different from the plane C including the axes of the needle valves 58a and 58b as shown in FIG. 15. Accordingly, the melted plastic resin flowing through the passage 55 enters into the valve chambers 56a and 56b only from one side of the chambers and then flows through a helical paths as shown in FIG. 16, whereby the tendency of deposition of the plastic resin can be substantially eliminated.

The inner ends of the screw threaded plugs 61a and 61b, brought adjacent to the valve chambers 56a and 56b are formed, as described hereinabove, with curved surfaces of a radius of curvature R and tangent to the peripheral surfaces of the valve chambers 56a and 56b.

Figure 16:
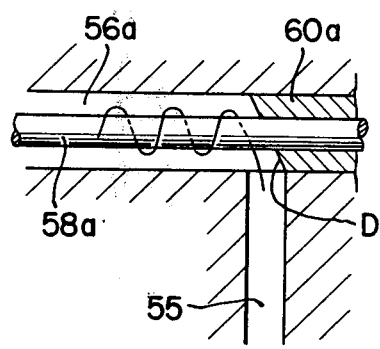
FIG. 16 is a partial sectional view showing in more detail a portion designated by "a" in FIG. 13.
Figure 17:
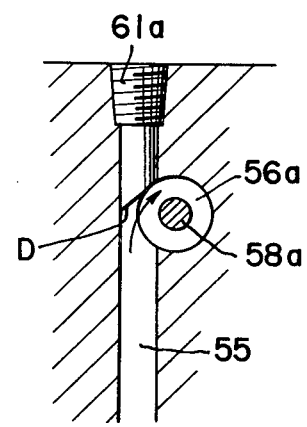
FIG. 17 is a partial sectional view showing the detail of a portion designated by "b" in FIG. 14.

Furthermore, the sleeve 60a (or 60b) slidably supporting the needle valve 58a (or 58b) is extended into the valve chamber 56a (or 56b) as shown in FIG. 16, the forward end of the sleeve 60a (or 60b) is formed with an oblique surface D smoothly connected with the surfaces of the junction between the lateral passage 55 and the valve chamber 56a (or 56b). Accordingly, the helical flow of the plastic resin is further intensified at the junction, and the possibility of causing deposition of the plastic resin is further reduced.

Figure 19:
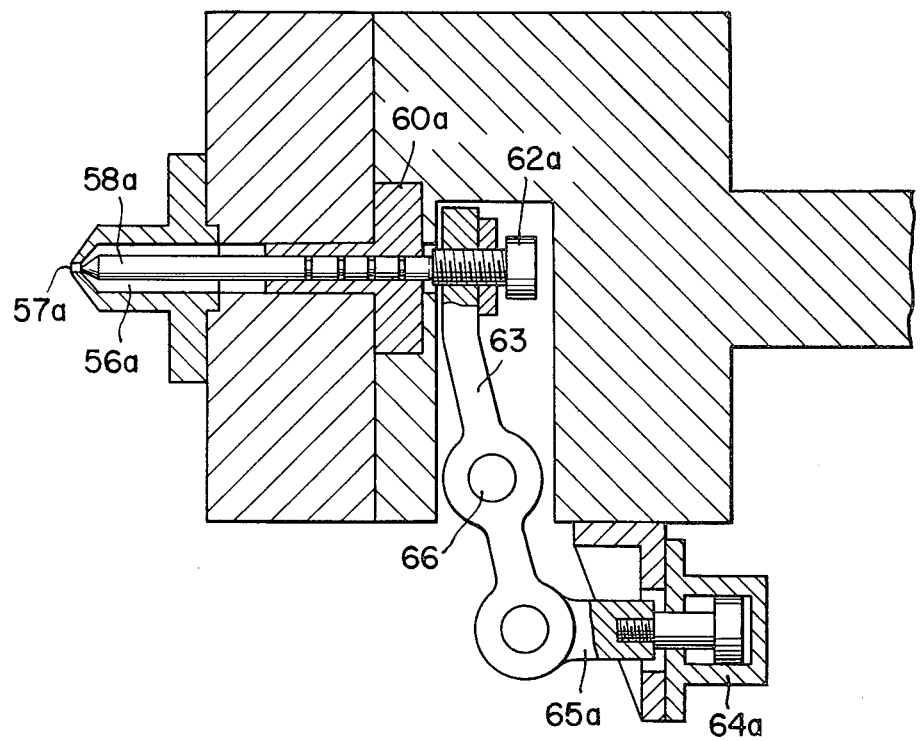
FIG. 19 is a cross-sectional view taken along the line XIX—XIX in FIG. 18.

The above described needle valve urging mechanism provided for each needle valve as shown in FIG. 13 may be modified as shown in FIGS. 18 and 19. In this modification, the mechanism comprises adjusting bolts 62a and 62b, lever 63 swingable around pivot pins 66 and hydraulic cylinders 64 for operating the levers 63.

By adjusting the positions of the adjusting bolts 62a and 62b, the machined length difference of the needle valves 58a and 58b can be adjusted. More specifically, each adjusting bolt, for instance, 62a is threaded into a threaded hole provided through one end of a lever, for instance 63a, to an extent required for adjusting the machined and assembled erros of the longitudinal dimension of the needle value. The lever 63 swingable about a pivot pin 66 has another end connected to a piston rod 65 in the hydraulic cylinder 64. When pressurized fluid is introduced into one side of the hydraulic cylinder 64, the lever 63 is rotated counterclockwisely as viewed in FIG. 19, and the forward end of the adjusting bolt 62a urges the needle valve 58a forwardly to normally close the nozzle 57a.

Figure 20:
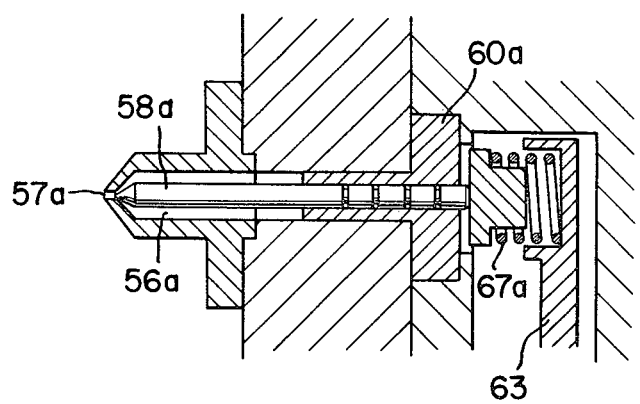
FIG. 20 is a partial sectional view showing a modification of a mechanism shown in FIG. 18.

FIG. 20 illustrates still another modification wherein springs 67a and 67b (not shown) are used instead of the adjusting bolts 62a and 62b at an end of the levers 63a and 63b, respectively. In this example, when the pressure of the plastic resin filling the valve chambers 56a and 56b exceeds a predetermined value corresponding to the pressure of the pressurized fluid, the needle valves 58a and 58b retract thereby opening the nozzles 57a and 57b, respectively.

According to the present invention, there is provided a valve nozzle device provided between a heating cylinder of an injection molding machine and at least one metal mold, and including at least one nozzle each controlled by a needle valve so as to inject a plastic resin melted in the heating cylinder into the metal mold, the device comprising a first passage connected to the heating cylinder for supplying the plastic resin therethrough, a third passage provided around the needle valve to be merged into the nozzle, and a second passage interconnecting the first and third passages, the second passage having a central axis extending in a plane other than a plane including a central axis of the needle valve, and the second passage being connected with the third passage in such a positional relation that the plastic resin in the second passage flows into the third passage from one side thereof followed by a helical path extending around the needle valve.

The device further comprises a mechanism for urging the needle valve toward the nozzle so that the nozzle is normally closed.

Although some preferred constructions of the mechanism have been described, it is apparent that various changes and modifications may also be utilized in the valve nozzle device without departing the scope of the present invention.

I claim:

1. A valve nozzle device provided between a heating cylinder of an injection molding machine and at least one metal mold, and including at least one nozzle each controlled by a needle valve so as to inject a plastic resin melted in said heating cylinder into said metal mold, said device comprising first passage means connected to said heating cylinder for supplying said plastic resin melted in said heating cylinder therethrough, third passage means each provided in the form of a smooth cylinderical passage extending to envelope said needle valve so as to be merged into said nozzle, and second passage means interconnecting said first and third passage means, said second passage means having a central axis extending in a plane other than a plane including a central axis of said needle valve, said second passage means being connected with said third passage means in such a positional relation that said plastic resin in said second passage means flows into said third passage means from one side thereof following a helical path extending around said needle valve.

2. A valve nozzle device as set forth in claim 1 wherein said positional relation is variable in a range including a position where the circumference of said second passage means is tangent to the circumference of said third passage means and another position where the circumference of said second passage means is tangent to the central axis of said needle valve.

3. A valve nozzle device as set forth in claim 1 which further comprises a sheath-like member slidably supporting said needle valve, an end portion thereof projecting into a junction between said second and third passage means, and formed into a surface that is oblique to the lengthwise direction of the needle valve for smoothing the flow of the plastic resin.

4. A valve nozzle device as set forth in claim 1 wherein a mechanism operated by a pressurized fluid is further provided for urging the needle valve toward said nozzle so that the needle valve normally closes said nozzle.

5. A valve nozzle device as set forth in claim 4 wherein the number of said needle valves and said nozzles is selected to be two or more than two, and said mechanism operated by a pressurized fluid is operable to open said nozzles simultaneously.

6. A valve nozzle device as set forth in claim 5 wherein said mechanism comprises a lever swingable around a pivotal point, a hydraulic cylinder urging an end of said lever to one direction, and a position adjusting member provided between another end of said lever and an end of said needle valve away from said nozzle.

7. A valve nozzle device as set forth in claim 6 wherein said position adjust member is a screw threaded bolt threaded into said another end of said lever so that an end of said bolt normally abuts against said end of said needle valve and normally urges the needle valve toward said nozzle.

8. A valve nozzle device as set forth in claim 6 wherein said position adjusting member is a buffer spring provided between said another end of said lever and said end of said needle valve.

* * * * *